Sept. 15, 1942.   W. C. FURNAS ET AL   2,296,157
THERMAL OVERLOAD DEVICE
Filed Oct. 14, 1940   4 Sheets-Sheet 1

INVENTORS
W. C. Furnas
BY D. G. Spotts
Morsell, Lieber & Morsell
ATTORNEY

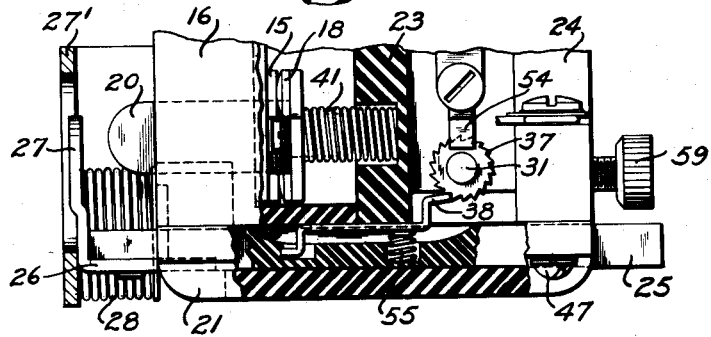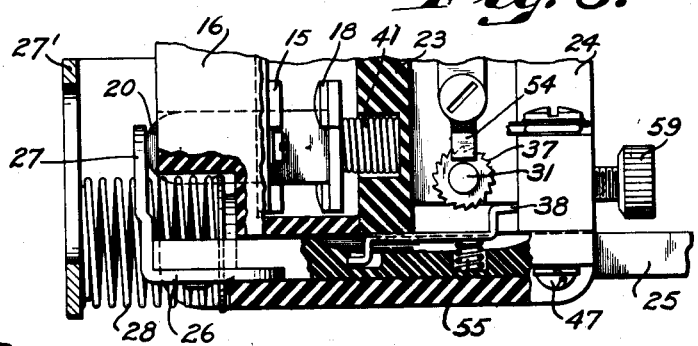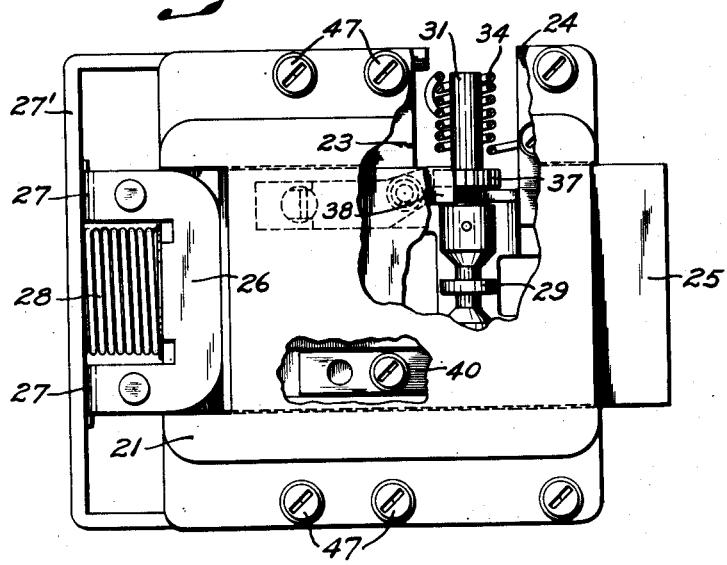

Sept. 15, 1942.        W. C. FURNAS ET AL        2,296,157
                       THERMAL OVERLOAD DEVICE
                       Filed Oct. 14, 1940        4 Sheets-Sheet 3
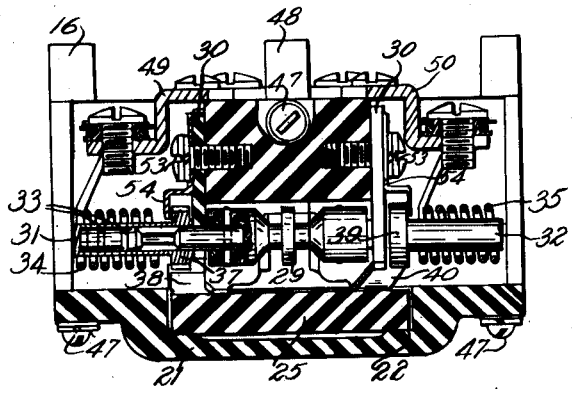
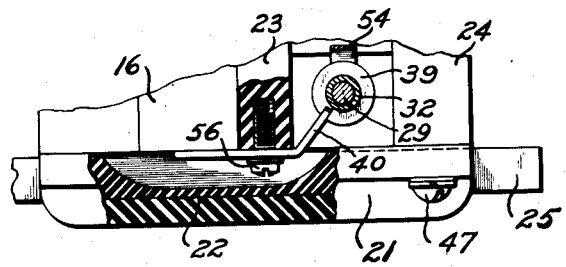
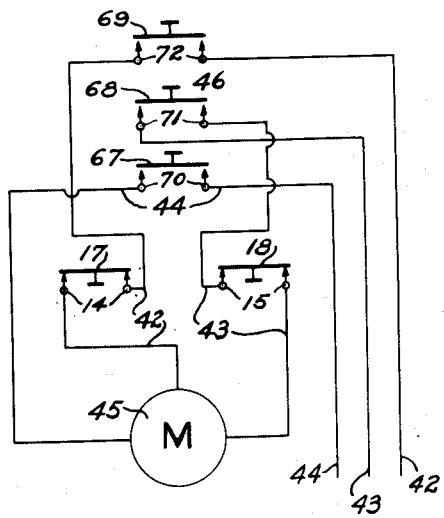
INVENTORS
W. C. Furnas
BY O. G. Spotts
Morsell, Liebert & Morsell
ATTORNEY Sept. 15, 1942.  W. C. FURNAS ET AL  2,296,157
THERMAL OVERLOAD DEVICE
Filed Oct. 14, 1940   4 Sheets-Sheet 4

INVENTORS
W. C. Furnas
BY D. G. Spotts
Morsell, Lieber & Morsell
ATTORNEY

Patented Sept. 15, 1942

2,296,157

UNITED STATES PATENT OFFICE 2,296,157

THERMAL OVERLOAD DEVICE

William C. Furnas, West Allis, and Daniel G. Spotts, Milwaukee, Wis.; said Spotts assignor of his right to William C. Furnas, doing business as Furnas Electric Company, West Allis, Wis.

Application October 14, 1940, Serial No. 361,082

12 Claims. (Cl. 200—124)

The present invention relates in general to improvements in the art of protecting electrical equipment against damage due to overloading, and relates more specifically to various improvements in the construction and operation of thermal overload devices for poly-phase electrical systems.

An object of our invention is to provide an improved thermal overload device which is simple and compact in construction, and which is moreover automatic and highly efficient in operation.

Many different types of devices for protecting electrical equipment against damage due to overloading, have heretofore been proposed and used commercially with more or less success; and while the problem of providing such devices for single phase or two-wire circuits is relatively simple, the provision of effective overload protective devices for poly-phase circuits is far more complex. In order to insure maximum protection with minimum delay in restoring normal operating conditions, a poly-phase overload mechanism should be capable of functioning positively, quickly and automatically in response to overload in either of several lines of the system, and it should also be possible to rapidly restore the circuit to normal condition after the same has been interrupted. While overload devices responsive to thermal changes resulting from overloading, have heretofore been used, these prior mechanisms were either too complicated, cumbersome, and unreliable, or they lacked adaptability for quick and effective restoration of normal operating conditions.

It is therefore a more specific object of our present invention, to provide a new and useful thermally actuated overload unit especially adapted for poly-phase electrical systems, and which meets all of the above mentioned requirements.

Another specific object of the present invention is to provide an improved poly-phase overload circuit breaker, which is durable in structure, positive in action, and in which normal operating conditions may be rapidly and effectively restored.

A further specific object of this invention is to provide an improved overload circuit interrupting mechanism and improved means for restoring the mechanism to a predetermined condition.

An additional specific object of the invention is to provide a multi-phase thermal overload device, in which overloading of any one of a plurality of lines will quickly actuate a common switch actuating element.

Still another specific object of our invention is to provide an improved combined overload and reversing switch assemblage which is adapted for diverse uses.

Another additional specific object of this invention is to provide an improved poly-phase overload device which can be readily associated with a standard switch assembly to produce a compact, durable and relatively simple unit adapted to be manufactured and sold at moderate cost.

These and other specific objects and advantages of our invention will be apparent from the following detailed description.

A clear conception of the several features constituting our present improvement, and of the mode of constructing, assembling and of operating overload devices built in accordance with the invention, may be had by referring to the drawings accompanying and forming a part of this specification in which like reference characters designate the same or similar parts in the various views.

Fig. 4 is a fragmentary part sectional side view of the device, showing the contacts closed and the contact operating slide set for automatic releasing;

Fig. 5 is another fragmentary part sectional side view of the assemblage, showing the operating slide released and the contacts separated to interrupt the circuit;

Fig. 6 is a bottom view of the improved overload device, having portions broken away to show normally concealed parts;

Fig. 7 is a transverse section through the thermal overload assemblage, taken along the line 7—7 of Fig. 1;

Fig. 8 is a fragmentary side view of the assemblage looking in a direction opposite to Fig. 4, and having portions broken away to show normally concealed parts;

Fig. 9 is a wiring diagram showing the mode of applying the improved overload device in a system having a reversing and resetting switch therein;

Figure 1:
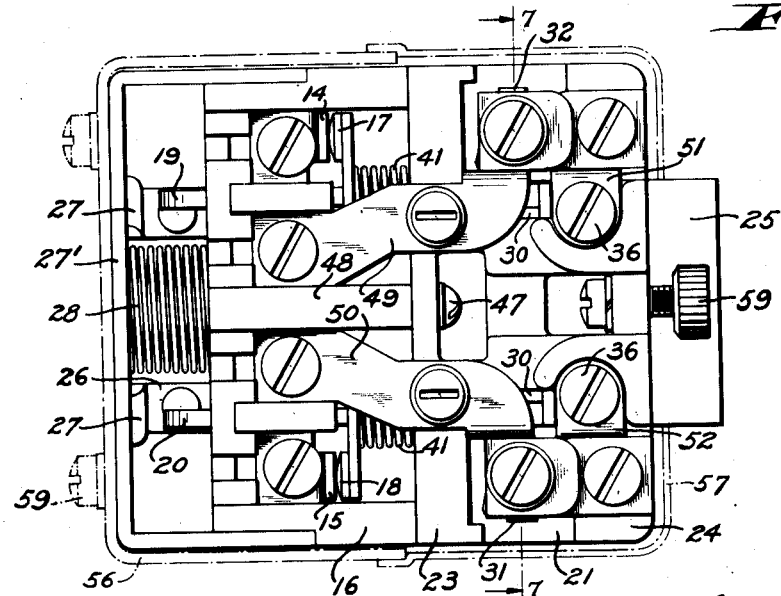
Fig. 1 is a top view of one of our improved polyphase thermal overload devices, showing the switch contacts thereof in closed position.

While our invention has been shown and described herein as being specifically embodied in a three-phase electrical system comprising one of the improved thermal overload devices having two sets of contacts, and a special rotary reversing switch mechanism associated with the overload device, it is not our desire or intent to thereby unnecessarily restrict the scope or utility of the improvement. It is also to be understood that while the device has been shown herein in a definite position, the improved assemblage can be placed and operated in any desired position, as for example in one horizontal position as shown in Figs. 3, 4, 5, and 8, or in inverted horizontal position as in Figs. 2 and 7, or on its side as in Figs. 1 and 6, or in vertical position as in Fig. 10.

Referring especially to Figs. 1 to 8 inclusive, the improved thermal overload device shown therein comprises in general, a switch assemblage having two sets of fixed contacts 14, 15 secured to an insulated support 16 and cooperating with sets of spring pressed movable contacts 17, 18 carried by guide bars 19, 20 respectively; an insulated main frame or base 21 to which the support 16 is secured, and which is provided with a central longitudinal guideway 22 and has a pair of integrally united insulating blocks 23, 24 secured thereto; a relatively wide elongated bar or slide 25 movable within the guideway 22 and having thereon a bracket 26 provided with fingers 27 which are cooperable with the contact guide bars 19, 20; a yoke 27' secured to the switch support 16 and providing a reaction plate for a coiled compression spring 28 which coacts with the slide bracket 26; a transverse shaft 29 carried by side plates 30 secured to the insulating block 24, and having tubular elements 31, 32 respectively normally secured to the shaft by means of spaced rings 33 and thin tubular films of low temperature fusible metal; heating coils 34, 35 loosely surrounding the elements 31, 32 respectively, and having their corresponding ends conductively connected to corresponding fixed contacts 14, 15 respectively, while their opposite corresponding ends are connected to terminal screws 36; a toothed wheel or ratchet 37 formed integral with the element 31 and coacting with a spring pressed pawl 38 carried by the slide 25; and a locally recessed flange 39 formed integral with the other element 32 and coacting with a retaining or rotation preventing reed 40 secured to the other insulating block 23.

Figure 2:
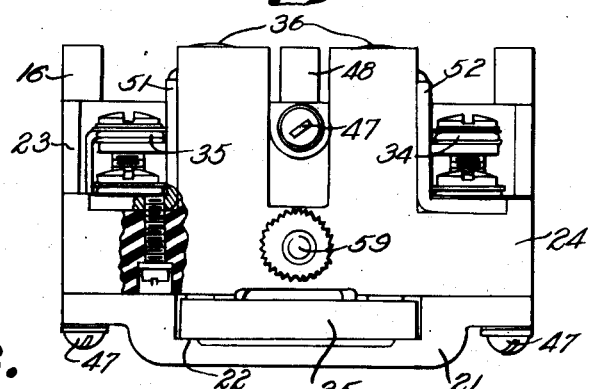
Fig. 2 is an end view of the device of Fig. 1, with a portion thereof broken away to show internal details of construction.
Figure 3:
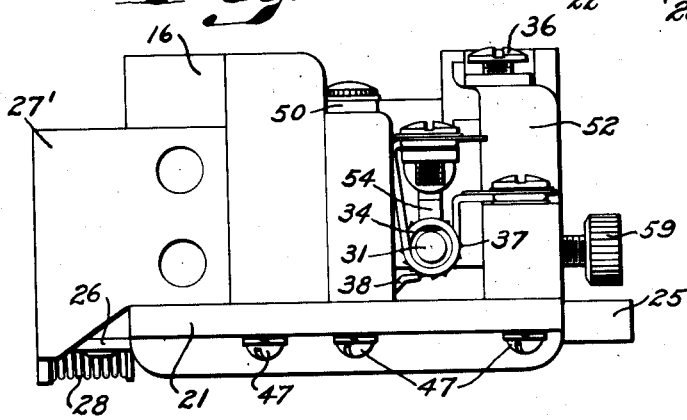
Fig. 3 is a side view of the assemblage of Figs. 1 and 2.

The contact support 16, main frame base 21, slide 25, and blocks 23, 24 are preferably formed of moulded insulating material, and the bracket 26 and yoke 27' may be constructed of sheet metal with the aid of punches and dies. The movable contacts 17, 18 are normally urged toward the fixed contacts 14, 15 by means of coil springs 41 so as to complete the circuit through the lines 42, 43 of the electrical system shown in Fig. 9; and these lines 42, 43 together with the line 44 are connectible to a source of electric current such as a motor 45, through a reversing switch assemblage 46. The improved switch assemblage comprising the contacts 14, 15, 17, 18 and the support 16, is attachable as a unit to the base 21, by means of screws 47, and may be used for many other purposes. The contact spaces of this switch are segregated from each other by means of an insulating wall 48, and this wall may be additionally secured to the base 21 through the block 23 by means of a screw 47 as shown in Fig. 1. The blocks 23, 24 may also be firmly secured to the base 21 by means of fastening screws 47, and all of the attaching screws 47 may be provided with lock washers as shown. The fixed contacts 14, 15 which are nearest each other, are conductively connected to their respective heating coils 34, 35, by means of conductors 49, 50; and the opposite ends of the coils 34, 35 are connected respectively to the binding posts or terminal screws 36 by means of other conductors 51, 52.

The elongated bar or slide 25 is freely slidable in the guideway 22 formed in the base 21, and the fingers 27 of the bracket 26 which is secured to one end of the slide 25, are movable in direct alinement with the movable contact carrier and guide bars 19, 20, see Figs. 1, 4 and 5. The compression spring 28 coacts with the bracket 26 and with the yoke 27' between the fingers 27, and constantly tends to move the contacts 17, 18 away from the fixed contacts 14, 15, and to thereby interrupt the lines 42, 43. However, such interruption of the circuits is normally prevented by the shaft 29 and the tubular elements 31, 32 which are rigidly attached to this shaft 29 by the fusible rings 33 as shown in Fig. 7. As previously indicated, the transverse shaft 29 is journalled in insulating side plates 30 rigidly attached to the insulating block 24 by means of screws 53, and the shaft 29 is formed of three alined rigidly interconnected sections of which the central section is made of insulating material while the opposite end sections are constructed of metal with which the rings 33 will readily unite when cool, and upon which the elements 31, 32 are snugly fitted. The tubular elements 31, 32 are also formed of similar metal, and are prevented from shifting longitudinally of the shaft 29 when the rings 33 are reduced to a molten or plastic state by the heat generated by one or both of the coils 34, 35, by means of metal clips 54 held in place by the screws 53 and coacting with the ratchet 37 and flange 39 respectively, see Fig. 7. The pawl 38 which normally coacts with the ratchet 37, is resiliently supported directly by the slide bar 25, being urged toward the ratchet wheel by a spring 55 as shown in Fig. 5; and the holding reed 40 which constantly fixes the element 32 and its flange 39 against rotation, is secured to the fixed block 23 by means of a screw 56, see Fig. 8. The assemblage is obviously such that when the parts are in the position shown in Fig. 4 and the fusible rings 33 are cold, the movable switch contacts 17, 18 will be in closed position; whereas if either coil 34, 35 is heated by overloading of the electrical system sufficiently to melt the rings 33 in either element 31, 32, the slide 25 will be released and the spring 28 will immediately become effective to shift the slide and bracket 26 so as to simultaneously move both sets of contacts 17, 18 to open or circuit interrupting position. If the coil 34 becomes heated sufficiently to melt the rings 33 within the element 31, the reed 40 will prevent rotation of the element 32 and shaft 29, but the spring 28 will immediately become effective to shift the slide 25 and the pawl 38 to the right as viewed in Figs. 4 and 5, and will thus rotate the released element 31 sufficiently to cause the pawl 38 to move out of engagement with the ratchet 37, thereby opening the switch. If on the other hand, the coil 35 becomes heated sufficiently to melt the rings 33 within the element 32, the reed 40 will again prevent rotation of this element 32 but not of the shaft 29, so that the spring 28 will then become effective to shift the slide 25 and the pawl 38 to the right, and the pawl will rotate both the element 31 and the attached shaft 29 until the pawl 38 disengages the ratchet 37, thereby likewise opening the switch.

Figure 10:
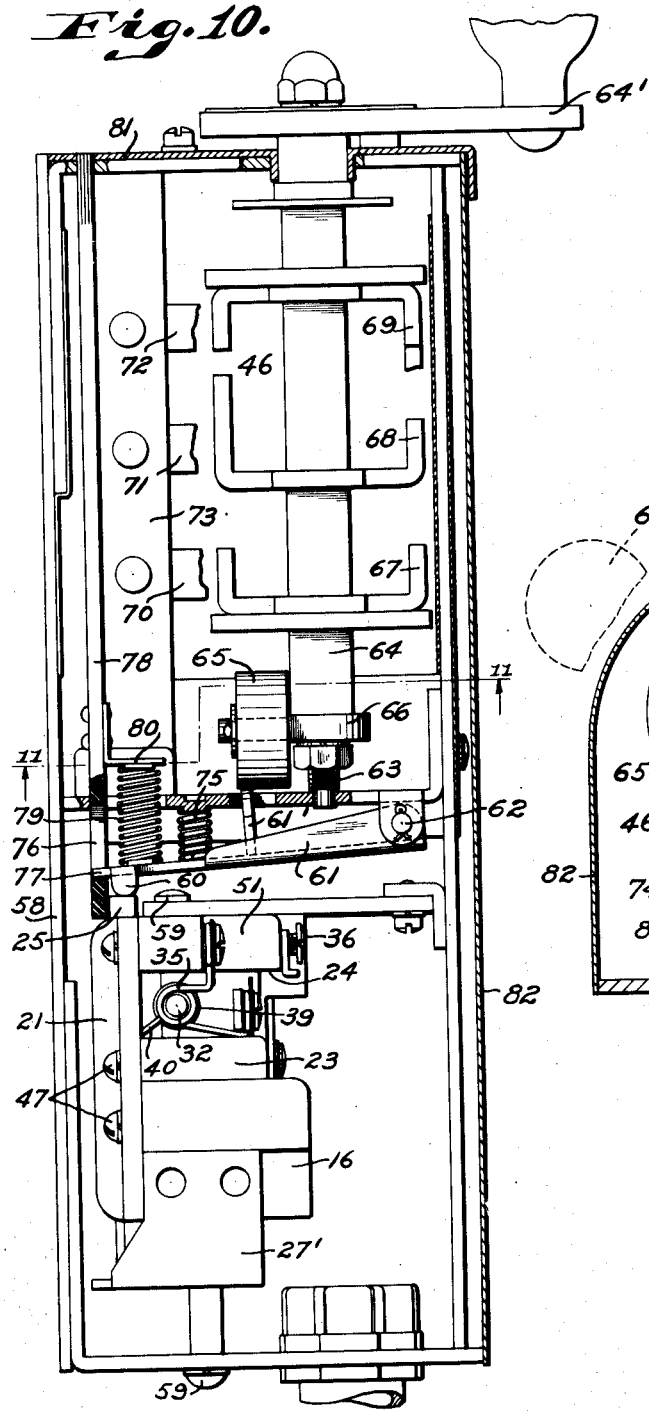
Fig. 10 is a part sectional side elevation of a combined overload and reversing switch assembly.
Figure 11:
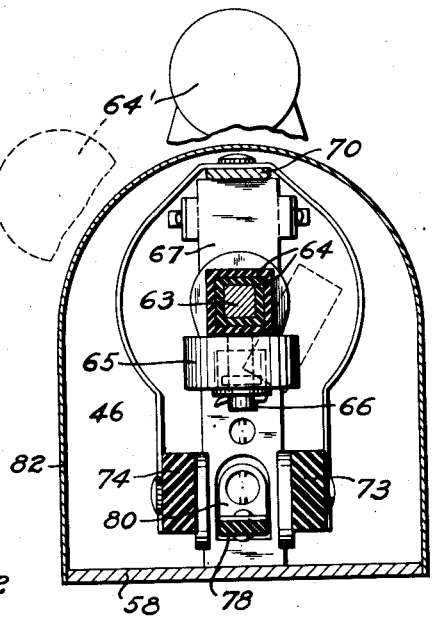
Fig. 11 is a transverse section through the reversing and resetting switch, taken along the line 11—11 of Fig. 10.

While the improved thermal overload device is adapted to be utilized as a unit disposed in any position, and in conjunction with any single or poly-phase electrical system, and may be housed within an outer casing 56 having a removable cover 57 as illustrated in dot-and-dash lines in Fig. 1; the device may also be utilized in conjunction with a manually operable reversing switch 46 as shown in Figs. 9, 10 and 11. In the assemblage of Figs. 10 and 11, the overload device is fixedly suspended from the reversing switch frame 58 by means of clamping and attaching screws 59, and the outer end of the movable slide 25 coacts with abutments 60 formed on the swinging end of an arm 61 swingably suspended from the frame 58 by means of a pivot pin 62. The controller or switch 46 may be of the general type shown and described in detail in Furnas and Thompson Patents Numbers 2,108,883 and 2,137,481, and comprises in general a spindle 63 journalled for rotation in the frame 58 and being embraced by insulating bushings 64; an operating crank or handle 64' secured to one end of the spindle 63; a roller 65 journalled on a crank 66 secured to the opposite end portion of the spindle 63, and being adapted to coact with a lug 66' formed on the medial portion of the swingable lever arm 61 in order to reset the overload device; three sets of movable contacts 67, 68, 69 carried by the medial portion of the spindle 63; and three sets of relatively fixed contacts 70, 71, 72 carried by side bars 73, 74 secured to the frame 58, and being cooperable with the movable contacts 67, 68, 69 respectively. The lever arm 61 is constantly urged in one direction so that the lugs 60 thereon maintain contact with the outer end of the slide 25, by means of a spring 75; and the extreme end 77 of this arm 61 coacts with a slot 76 in a reciprocable indicator bar 78 which is slidably mounted in the frame 58. A relatively light coil spring 79 coacts with the arm 61 and with a bracket 80 carried by the bar 78, and the end of the bar 78 remote from the slot 76 is adapted to be projected externally of the end wall 81 of the frame 58 when the slide 25 is released to open the overload contacts 17, 18. The entire overload and reversing switch mechanism may be housed within a readily removable cover 82 as shown in Figs. 10 and 11.

During normal operation of the improved overload device, the overload assemblage of Figs. 1 to 8 inclusive may be interposed in the lines 42, 43, 44, in the manner shown in the diagram of Fig. 9, and the slide 25 will normally be set in the position shown in Fig. 4 wherein the circuit through the fixed contacts 14, 15 and through the movable contacts 17, 18 will be completed. The heating coils 34, 35 will be located within the lines 42, 43 respectively and will not become heated unless overload conditions prevail in the electric circuit. The slide 25 will be held in the position shown in Fig. 4 by means of the pawl 38 coacting with the ratchet 37, and the reed 40 will have coaction with the recessed flange 39.

When an overload condition is reached in either of the lines 42, 43, the heating coil 34, 35 within the overloaded line will become heated sufficiently to melt the metal films and rings 33 within the corresponding element 31, 32. If the overloading occurs in the line 42, then the coil 35 will be heated and will release the shaft 29 from within the fixedly positioned element 32, thereby permitting the spring 28 to become effective to quickly shift the slide 25 from the position shown in Fig. 4 to that illustrated in Fig. 5. The release of the shaft 29 from within the element 32 and the displacement of the slide 25, will cause the pawl 38 to revolve the ratchet 37 and the shaft 29, and will thus permit unrestrained shifting of the slide 25 by the heavy spring 28.

If the heating coil 34 in the line 43 should become heated due to overloading, the element 31 will be released from the shaft 29 by virtue of the melting of the rings 33 within the element 31. This release of the element 31 from the shaft 29, will again permit the slide 25 to shift under the influence of the spring 28, and during such shifting the pawl 38 will rotate the released element 31 and ratchet 37, thus permitting the slide 25 to move freely. In this case the shaft 29 will be retained in fixed position by the reed 40 coacting with the flange 39, and only the element 31 will be released for rotation.

When the slide 25 moves from the position shown in Fig. 4 to that shown in Fig. 5, the fingers 27 of the bracket 26 which is carried by the slide 25, engage the movable contact supporting bars 19, 20, and quickly open both sets of contacts. The movement of the contacts 17, 18 is simultaneous, so that both lines 42, 43 will be simultaneously interrupted whenever overloading of either or both of these lines occurs. As soon as the circuit is interrupted, and regardless of which heating coil 34, 35 has been overloaded, the molten metal films and rings 33 will again quickly reunite the shaft 29 and the elements 31, 32. The thermal overload mechanism will then be automatically restored to the position shown in Fig. 7, preparatory to resetting of the slide 25. Such resetting or return of the slide 25 from the position shown in Fig. 5 to that shown in Fig. 4, may be readily accomplished by merely pushing against the projecting end of the slide 25 until the latch 38 re-engages the ratchet 37. As the fingers 27 are withdrawn from the ends of the bars 20, the springs 41 will become quickly effective to move the contacts 17, 18 into engagement with the contacts 14, 15, thereby re-establishing the circuit through the lines 42, 43 and returning the system to normal operating conditions.

The return of the overload device to normal operating conditions may be readily effected with mechanism such as shown in Figs. 10 and 11, which mechanism operates in the following manner. When overloading of a line 42, 43 occurs, the slide 25 will be urged upwardly from the position shown in Fig. 10 and will move the lever arm 61 upwardly. This upward swinging motion of the lever 61 is possible because the handle 64' and the roller 65 will have been moved out of central position when the circuit is closed, for either forward or reverse operation, thus permitting the lug 66' to move upwardly without obstruction. The upward swinging motion of the lever 61 will simultaneously move the signal bar 81 upwardly to indicate that the overload device has operated, and after the overload device has interrupted the circuit, the handle 64' must be returned to central or off position as shown in solid lines in Fig. 11, in order to cause the roller 65 to coact with the lever 61 and reset the overload mechanism. When the roller 65 is thus returned to central position, it engages the lug 61' and swings the lever 61 downwardly to positively return the slide 25 to normal position. After the overload device has been thus reset, the handle 64' can be manipulated in the desired direction to operate the the reversing switch 46 affecting the overload switch contacts. In this manner the overload device may be utilized in conjunction with a controller or reversing switch 46 and a signal, and the assemblage may be quickly reset for normal operation.

From the foregoing detailed description it will be apparent that our present invention provide an extremely simple, compact, and highly efficient thermal overload device which may be utilized either for single or poly-phase electric circuits. The device is especially useful in poly-phase systems because it insures simultaneous interruption of at least two lines of the system. The circuit through all of the lines may be quickly and simultaneously re-established without replacing fuses or other parts, and by merely restoring the slide 25 to inactive position, since the thermal overload devices are self-restoring. All portions of the improved overload device are sturdily constructed and are effectively insulated wherever necessary, and the overload unit obviously occupies relatively small space and may therefore be utilized for diverse purposes. The combined assemblage of reversing switch and overload device is especially useful under many conditions, and the overload device may obviously be readily combined with most standard reversing switches or controllers. The improved overload assemblage can also be manufactured and sold at moderate cost, and has proven highly satisfactory in actual commercial use. The switch assemblage which is utilized in the overload unit is also so constructed that it can be used in various types of switch assemblages as well as in the overload unit, and this switch assemblage has also proven highly satisfactory in actual use.

It should be understood that it is not desired to limit this invention to the exact details of construction or to the precise mode of operation, herein shown and described, for various modifications within the scope of the claims may occur to persons skilled in the art.

We claim:

1. In combination, a switch having a frame and several independent simultaneously reciprocable contacts mounted upon said frame for controlling the flow of electric current through separate lines of a circuit, an overload heating coil interposed in each of said lines, said coils being disposed concentric with a common axis, an element slidable upon said frame transversely of said axis and being cooperable with said contacts to interrupt all of said lines, a shaft disposed concentrically of said coils and having sleeves secured thereto by means of low temperature fusible material, a ratchet connecting one of said sleeves with said slidable element, and means positively and rigidly connecting another of said sleeves with said frame.

2. In combination, fixed and movable contacts cooperating to complete a circuit, a pair of heating coils adapted to be energized by overloading of said circuit, a rotary member disposed within said coils, an element secured to said member within one of said coils and coacting with said movable contacts through a ratchet, another element secured to said member within the other coil and being permanently fixed against rotation, and fusible means connecting said elements to said member.

3. In combination, two sets of fixed and movable contacts cooperating to complete two lines of an electric circuit, a heating coil interposed in each of said lines, a shaft extending into both of said coils, an element secured to said shaft within each of said coils by fusible metal adapted to be melted by overloading of the corresponding line sufficiently to heat the corresponding coil, movable means for separating said contacts, a ratchet interposed between one of said elements and said movable means for normally holding the latter in inactive position, and retaining means for constantly preventing rotation of the other of said elements.

4. In combination, two sets of fixed and movable contacts cooperating to complete two lines of an electric circuit, a heating coil interposed in each of said lines, a shaft extending into both of said coils, an element secured to said shaft within each of said coils by fusible metal adapted to be melted by overloading of the corresponding line sufficiently to heat the corresponding coil, a movable slide adapted to simultaneously separate said contacts, a ratchet interposed between one of said elements and said slide for normally holding the latter inactive, and means for positively preventing rotation of the other element when the same is released from said shaft.

5. In combination, movable contacts for completing electric circuits through independent lines each having an overload heating coil therein, a shaft disposed within both of said coils, an element secured by heat fusible metal to said shaft within each of said coils, a slide movable to simultaneously open all of said contacts whenever either of said coils is overheated, a ratchet interposed between said slide and one of said elements for releasing said slide for actuation of said contacts upon overload heating of either coil, and means for fixing one of said elements against rotation while permitting free rotation of said shaft and actuation of said ratchet under certain overload conditions.

6. In combination, fixed and movable contacts cooperating to complete a circuit, a pair of coaxial heating coils adapted to be energized by overloading of the circuit, a shaft disposed within both of said coils, a sleeve secured to said shaft within one of said coils and coacting with said movable contact through a ratchet, another sleeve secured to said shaft within the other coil and being permanently fixed against rotation, and fusible means normally connecting said sleeves to said shaft.

7. In combination, a frame, fixed and movable contacts carried by said frame and co-operating to make and break a circuit, a pair of coaxial heating coils mounted upon said frame and adapted to be energized by overloading of the circuit, a shaft journalled on said frame and having opposite ends disposed within said coils, a sleeve secured to one end of said shaft and coacting with said movable contact through a ratchet, another sleeve secured to the opposite end of said shaft and being permanently fixed against rotation relative to said frame, and heat fusible means normally connecting said sleeves to said shaft ends.

8. In combination, fixed and movable contacts co-operating to complete a circuit, laterally separated heating coils adapted to be energized by overloading of the circuit, a rotary shaft disposed within said coils, a sleeve element secured to said shaft within one of said coils and coacting with said movable contact through ratchet means, another sleeve element secured to said shaft within the other coil and being constantly fixed against rotation, and heat fusible metal connecting each of said sleeve elements to said shaft.

9. In combination, fixed and movable contacts co-operating to complete a circuit, a pair of heating coils adapted to be energized by overloading of the circuit, a rotary shaft disposed within both of said coils, an element secured by heat fusible material to said shaft within each of said coils, a slide movable to interrupt the circuit when either of said coils is overheated, ratchet means interposed between said slide and one of said elements for releasing the slide for actuation of said movable contact upon overload heating of either coil, and means for permanently fixing the other of said elements against rotation while permitting free rotation of the shaft under certain overload conditions.

10. In combination, a frame, fixed and movable contacts carried by said frame and co-operating to complete a circuit, axially alined heating coils mounted upon said frame and adapted to be energized by overloading of the circuit, a rotary shaft journalled on said frame and disposed within said coils, a sleeve element normally secured by heat fusible material to said shaft within each of said coils, a slide movable upon said frame to interrupt the circuit when either of said coils is overloaded, ratchet means interposed between said slide and one of said sleeve elements for releasing the slide to effect actuation of the movable contact upon overload heating of one of said coils, and means for fixing the other of said sleeve elements against rotation while permitting free rotation of said shaft under certain overload conditions.

11. In combination, a frame, fixed and movable contacts carried by said frame and co-operating to complete a circuit, axially alined heating coils mounted upon said frame and adapted to be energized by overloading of the circuit, a rotary shaft journalled on said frame and disposed within said coils, a sleeve element normally secured by heat fusible material to said shaft within each of said coils, a slide movable upon said frame to interrupt the circuit when either of said coils is overloaded, spring means for constantly urging said slide toward contact opening position, ratchet means interposed between said slide and one of said sleeve elements for releasing the slide to effect actuation of the movable contact upon overload heating of one of said coils, and means for fixing the other of said sleeve elements against rotation while permitting free rotation of said shaft under certain overload conditions.

12. In combination, fixed and movable contacts co-operating to complete a circuit, alined heating coils adapted to be energized by overloading of the circuit, a shaft having ends extending into both of said coils, a sleeve secured by heat fusible material to each of said shaft ends within the adjacent coils, a slide movable to interrupt the circuit by shifting said movable contact when either of said coils is overheated, spring means constantly urging said slide toward contact opening position, ratchet means interposed between said slide and one of said sleeves for releasing the slide for actuation by said spring means upon overload heating of either coil, and means for fixing the other of said sleeves against rotation while permitting free rotation of said shaft under certain overload conditions.

WILLIAM C. FURNAS.
DANIEL G. SPOTTS.